Nov. 6, 1956    A. A. SOLLA    2,769,682
CONTROL MECHANISMS FOR PRINTING MACHINES
Filed Sept. 16, 1953    3 Sheets-Sheet 1
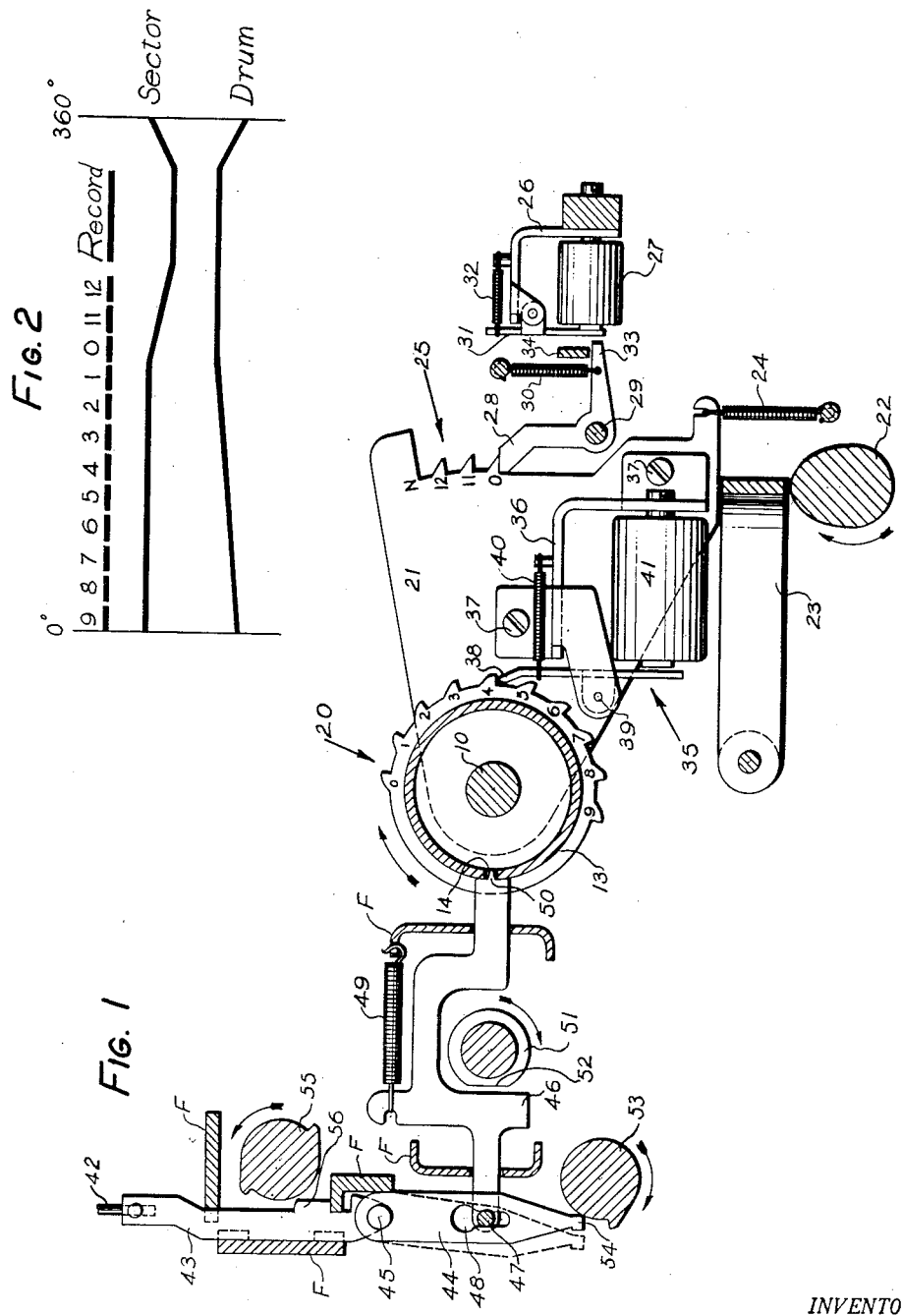
INVENTOR.
ALEXANDER A. SOLLA
BY
Jerome T. Bauer
ATTORNEY Nov. 6, 1956  A. A. SOLLA  2,769,682
CONTROL MECHANISMS FOR PRINTING MACHINES
Filed Sept. 16, 1953  3 Sheets-Sheet 3
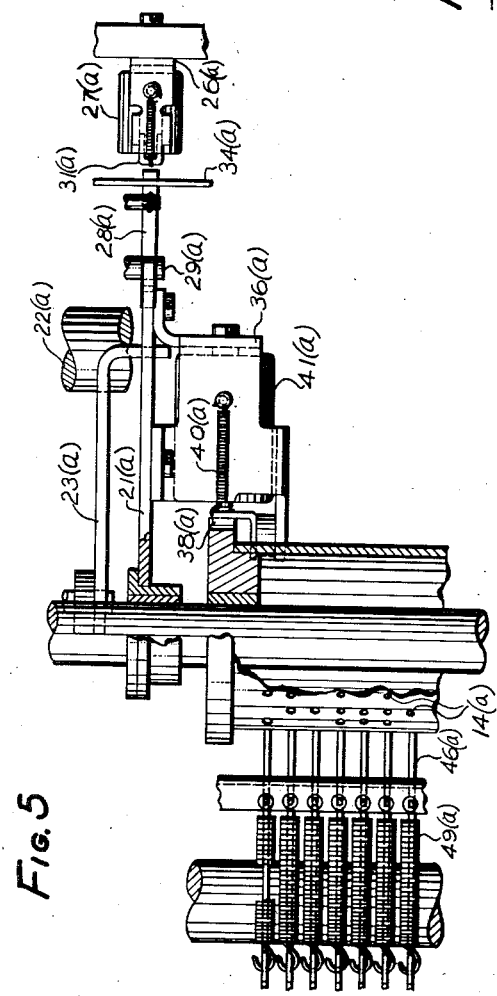
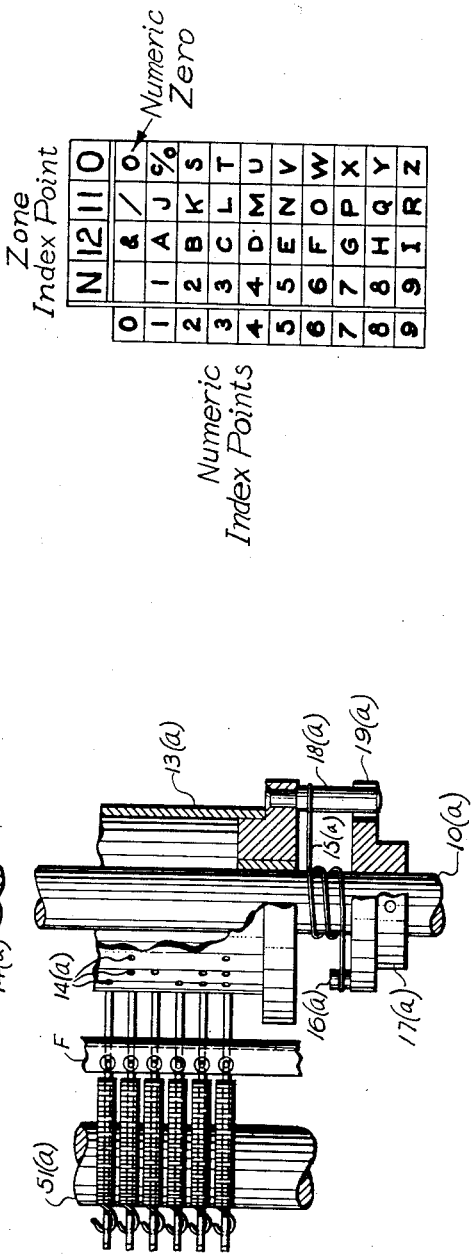
INVENTOR.
ALEXANDER A. SOLLA
BY
ATTORNEY United States Patent Office 2,769,682
Patented Nov. 6, 1956

2,769,682

CONTROL MECHANISMS FOR PRINTING MACHINES

Alexander A. Solla, Queens Village, N. Y., assignor to Burroughs Corporation, Detroit, Mich., a corporation of Michigan Application September 16, 1953, Serial No. 380,462

6 Claims. (Cl. 346—98)

This invention relates to selective recording machines and more particularly to a novel construction for selecting for operation the recording elements employed therein.

One of the objects of this invention is the provision of a novel arrangement whereby the recording elements of a recording machine can be positively selected for recording by a unitary mechanical member which is adapted to be positioned easily and accurately without complex movements.

Another object of this invention is the provision of a novel recording element selector device employing a recording element selector member having movement which is rotary in nature, either unidirectional or oscillatory.

Still another object of this invention is the provision of a novel construction for determining the movement of the recording element selector member.

A further object of this invention is the provision of a recording element selector mechanism which is capable of operating at high speeds, one which is easily maintainable, one which is compact and small in size and one which requires for its operation a relatively small amount of electrical current and power.

Figure 4:
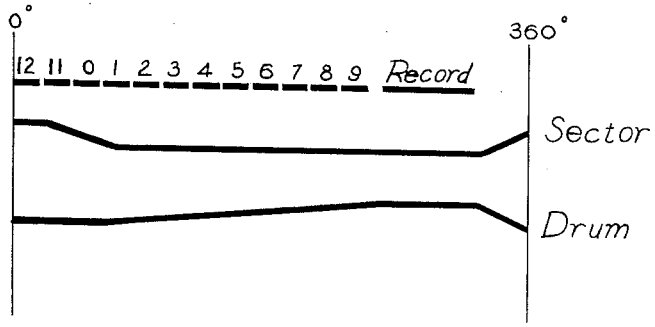
Figure 3:
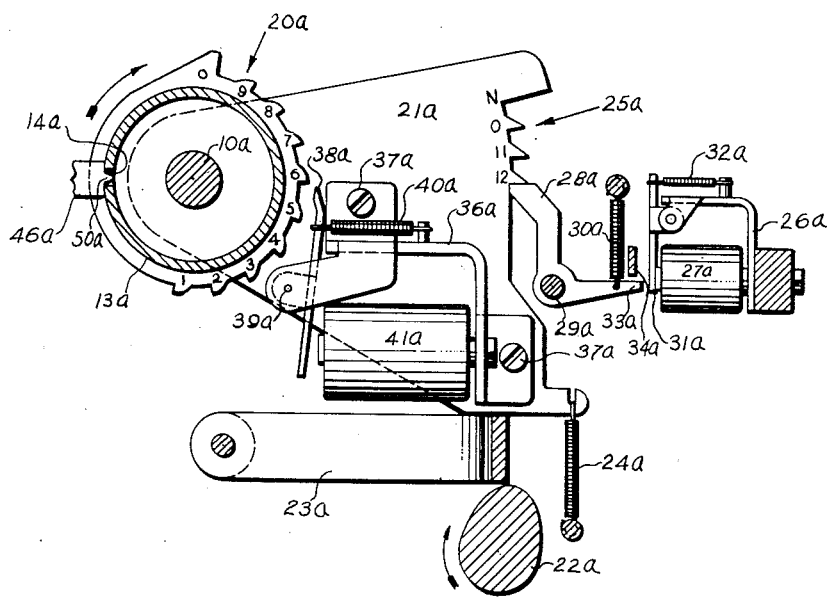

Other and further objects of this invention reside in the structures and arrangements hereinafter more fully described with reference to the accompanying drawings in which:

Fig. 1 is a side view of a recording element selecting device constructed in accordance with the principles of the invention, Fig. 2 is a chart showing the relative timing of the principal parts in Fig. 1, Fig. 3 is a partial side view of another recording element selecting device which likewise embodies the principles of the invention, Fig. 4 is a chart showing the relative timing of the principal elements in Fig. 3, Fig. 5 is a common plan view of the principal elements of the embodiments shown in both Figs. 1 and 3, Fig. 6 is a chart which shows graphically the combination of holes required at the zone and numeric index points on a record card to effect the recording of the characters attributed to each combination.

The recording element selector device of this invention is capable of being used in place of those presently in use in many of the well known selective recording machines, especially those which utilize recording elements that are operable in various combinations for recording selected characters. Each one of these selector devices is capable of recording a single character at a time, accordingly, the recording machine will have as many of these devices or sectional units as there will be characters per line or characters to be recorded simultaneously. Recording machines as hereinafter referred to should be interpreted to include one or more of the functions of printing, marking, perforating, etc.

The devices herein disclosed are intended to operate with recording machines which are adapted to record data taken from the well known 12-hole record card. In the use of the 12-hole record card the zone and numeric holes combine to effect the recording of certain characters (see Fig. 6). For example, a zone hole appearing at the "12" index point on a record card and a numeric hole appearing at the "1" index point on the same record card will be combined in the machine to effect the ultimate recording of the character "A." Similarly, the zone hole at the index point 11 will be combined with the numeric hole at index point 1 to effect the ultimate recording of the character "J," and so on through the chart. Referring to the chart, to record numeric zero, there must be a hole at the zone index point 0 and no hole at any of the numeric index points. Since there are only 9 numeric index points on a record card there cannot be a 0 or 10th index point or hole. Consequently, to effect numeric zero all that is required is the presence of the zone hole 0 and the absence of the numeric hole on the card.

Fig. 1, shows a recording element selector device employing a member which, during its operation, rotates constantly. Fig. 3, in contradistinction to Fig. 1, shows a recording element selector device which although appearingly similar in structure differs therefrom in that it employs a recording element selector member whose motion, during its operation, is purely oscillatory in nature. Each of the devices in Figs. 1 and 3 is shown in plan view in Fig. 5, since in either case the basic structure is the same. For clarity, the reference characters shown in Fig. 5 are the same as those in Fig. 1. The distinguishing suffix letter "a" added to the reference characters in the embodiment in Fig. 3 is shown in parenthesis next to each corresponding character in Fig. 5.

Referring to the embodiment shown in Fig. 1, the operation chart shown in Fig. 2, and the common plan view shown in Fig. 5, a shaft 10 is rotatively driven in timed relation with the remaining elements of the machine. Journalled on the shaft is a drum member 13 having positive engaging means in the form of holes 14. As the description proceeds it will become apparent that the positive engaging means may be supplied in some form of element structure other than the holes 14. Rotary motion is transmitted to the drum 13 from the drive shaft 10 by a torsion spring 15, one end of which bears against an abutment 16 on the collar 17 and the other end of which bears against a stud 18 on the drum 13. The collar 17 is pinned or keyed to the shaft 10. The collar supports a radially extended finger 19 which coacts with the stud 18 for a purpose which will be described later.

Holes 14 are circumferentially spaced about the drum 13 and are arranged to form lines of spaced engaging elements, there being a separate line of holes 14 for each character that may be recorded, and each line comprising a distinctive combination or pattern of these holes 14. At one end of the drum are a series of 10 stop teeth generally designated by the numeral 20. When each 4 lines of holes 14 moves past a given point each one of the teeth 20 will move past another given point. To aid in explaining the functions of the teeth 20 shown in Fig. 1, each tooth is numbered clockwise from 0 to 9, inclusive. The numbering of the teeth 1 to 9, inclusive, corresponds with the numbering of the numeric index points 1 to 9, inclusive, on a record card (see Fig. 2). The tooth numbered 0 has no corresponding index point on the record card, but is utilized in conjunction with any of the holes which can appear at the zone index points on the record card to record a character (see Fig. 6).

Also journalled for rotation about the shaft 10 is a sector 21 which executes an oscillating movement in the following manner. A cam 22 rotates in timed relation with the remaining elements of the recording machine and in timed relation with the shaft 10. Between the timed sector cam 22 and sector 21 is an idler member 23. As the timed sector cam 22 rotates clockwise, the sector 21 is moved upwardly and counterclockwise. Spring 24 attached to the lower end of the sector 21 permits the sector to oscillate in time with the cam 22 by urging the sector downwardly against the idler 23. As will be seen in Fig. 1, stop teeth generally designated 25 are predeterminately positioned on the sector 21. The stop teeth 25 perform a function similar to that of the teeth 20 on the drum 13 and are lettered 0, 11, 12 and N. The letters 0, 11 and 12 correspond to the index points 0, 11 and 12 on the record card (see Fig. 2). The tooth lettered N has no corresponding index point on the record card, but is combined with any hole which appears at the numeric index point on the index card to record a numeral (see Fig. 6). The stop tooth lettered N is of greater length than those lettered 0, 11 and 12. The reason for this will become apparent when the operation of the illustrated mechanism is described.

Mounted in juxtaposition to the sector 21 on frame 26 is an electromagnet 27. In Fig. 1 electromagnet 27 is shown in its energized condition. The electromagnet 27 is actuated when a hole is sensed in the record card at any one of the 3 zone index points. Between the stop teeth 25 on the sector 21 and the electromagnet 27 is a pawl 28 that stops the clockwise oscillations of the sector when a hole is sensed at one of the zone index points on the record card. The pawl 28 is pivotally mounted about a pin 29 while a spring 30 attached at the end of the pawl 28 urges the pawl toward engagement with the teeth on the sector. Pivotally mounted on the frame 26 is an electromagnet arm 31 constantly urged by spring 32 toward engagement with the pawl end 33. Between the spring 30 and arm 31 is a pawl reset bail 34. As the end of each cycle of operation the reset bail impinges upon the end 33 to disengage the pawl from the sector teeth 25. This action expands the spring 30 and lowers the end 33 of the pawl 28 to permit the then deenergized arm 31 to engage the end 33 to retain the pawl from engagement with the sector teeth until such time as the electromagnet 27 is again actuated.

As noted above, since it is necessary to combine both the zone and numeric data which can appear on the record card, it is necessary to provide means in the instant device to receive such data. As was previously disclosed the stop teeth on the sector 21 correspond to the zone index points 0, 11 and 12 on a record card while the stop teeth on the drum 13 correspond to the numeric index points 1 to 9 inclusive on a record card. Thus the sector 21 will be stopped by the pawl 28 when any corresponding hole which can appear at a zone index point on a record card is sensed.

The stop teeth 20 are employed to halt the rotation of the drum 13 at the proper time in a manner similar to that of the stop teeth 25 on the sector. The stopped position of the drum 13 and the stopped position of the sector 21 must be in a specific relative relationship. To do this a pawl arrangement 35 is mounted on the sector and is adapted to cooperate with the drum stop teeth 20. The pawl arrangement consists of a bracket 36 held to the sector by screws 37. Pawl 38 is pivotally mounted on the bracket at 39 and is constantly urged away from engagement with the stop teeth 20 by the spring 40. Electromagnet 41 when energized overcomes the yielding pull of spring 40 and pivots the pawl 38 into engagement with one of the stop teeth 20 corresponding to a hole at the respective numeric index point on the record card (as shown in Fig. 1). The operation of electromagnet 41 in response to the appearance of a hole at any one of the numeric index points on the record card is the same as that of electromagnet 27.

Positioned to cooperate with the positive engaging elements or holes 14 on the drum are a plurality of selective recording elements 42 (of which only one is illustrated in partial form in Fig. 1), and these recording elements 42 are adapted to be operated in various combinations to record selected characters. The recording elements 42 cooperate with the holes on the drum 13 by an interposer arrangement consisting of a plurality of links. An upper link 43 which is attached to each recording element is guided in the frame F while lower link 44 is pivotally connected at 45 to the upper link and cooperates therewith for a purpose which will be obvious. Crosslink or slide 46 positively engages the recording elements 42 with the holes 14 by way of the lower link through a pin-and-slot arrangement 47 and 48, respectively.

The crosslink 46 is guidingly mounted in a framework F and is urged by spring 49 toward engagement with the holes 14. Each crosslink has a finger like extension 50 which, when aligned with the holes 14, is urged into them by the spring 49. As shown in Fig. 1 a cam 51 rotating in timed relation with the shaft 10 and the cam 22, has a flat side 52 which when aligned with the crosslink will permit the spring 49 to urge the finger 50 into the hole 14. When the crosslinks have engaged the holes, positive actuating cam 53 will abut against surface 54 on the lower link to move the recording elements 42 to recording position. At the proper time during the cycle actuating cam 55, which cooperates with shoulder 56 on the upper link 43, abuts the shoulder to positively return the recording element from recording position.

In the operation of the embodiment of the invention as shown in Figs. 1, 2 and 5, at the start of the cycle of operation the record card is fed through the recording machine in reverse so that the numeric index points of the card will be sensed before the zone index points. As the card is being fed through the machine the drum 13 is rotated clockwise in timed relation with the feed of the record card while sector 21 is oscillated counterclockwise also in timed relation with the feed of the record card. Shaft 10 transmits the drive to the drum 13 through the torsion spring 15. Pawl 38 is held in its inactive position by spring 40, electromagnet 41 having not yet been energized. Upon the occurrence of a hole at any one of the numeric index points electromagnet 41 is energized to move the pawl 38 into engagement with one of the teeth 20 that corresponds to the hole sensed at one of the numeric index points. Hence, the rotation of the drum 13 is halted with respect to the sector 21.

In the meanwhile, sector 21 has been moved counterclockwise by the cam 22 in opposition to the spring 24. The pawl 28 has been held by the arm 31 while the electromagnet 27 has been deenergized. As the zone index points on the record card pass through the sensing portion of the recording machine, the sector 21 has completed its counterclockwise movement and begins to follow the cam 22 in a clockwise direction. The occurrence of a hole at any one of the zone index points of the card energizes the electromagnet 27 to remove the arm 31 from the tail end 33 of the pawl 28. Thus, the pawl 28 engages one of the teeth 25 on the sector corresponding to the index point on the record card at which the hole has appeared. Hence, both the rotation of the sector and the drum have been halted to present the desired line of recording element engaging holes 14 in a position to be engaged by the finger 50 on the interposer link 46.

At this time the timed cam 51 presents its flat surface 52 to the link to permit the spring 49 to urge the fingers 50 into engagement with the line of holes 14. When finger 50 senses a hole 14, the link 46 is moved to the right to straighten the link 44 and a surface 54 is engaged by the rotating actuator 53. Those links which do not sense holes in the drum remain in the inoperative dotted-line position as shown in Fig. 1. At the proper time, actuator 53 positively moves all those links 44 which have been selected for recording toward recording position. Near the end of the cycle rotating actuator 55 abuts the surface 56 to positively return all the recording elements to the cyclic starting position. Cam 51 having been rotated during the operation disengages the links 46 from the drum.

Electromagnets 41 and 27 are deenergized at the proper time to permit their respective pawls to move to inoperative position to allow the sector 21 and the drum 13 to return to their cyclic starting positions. The sector 21 is returned to its starting position by the spring 24 which moves the same down into engagement with the idler 23. The drum 13 is returned to starting position when the pawl 38 is urged away from the stop teeth 20 by the spring 40. During the recording and selecting operation the shaft 10 continues to rotate even when the drum 13 is stopped by the pawl 38. As a result spring 15 unwinds torsionally, hence when the pawl 38 is removed from the stop teeth 20 the spring 15 rapidly winds up torsionally to rotate the drum 13 to bring the stud 18 into engagement with radial extension 19 on the collar 17.

In the operation as described above it has been assumed that a hole will appear at the numeric and zone index points on the same record card. Referring to Fig. 6 it can be seen that in many instances the presence of a hole will not be necessary at one of the numeric or zone index points on the record card. For example, in order to record a numeric character there need not be a hole at any zone index point. To stop the oscillation of sector 21 at a predetermined time so that a line of engaging holes 14 will be presented to the links 46, the pawl 28 engages the sector at a "N" tooth when the pawl is held in its inoperative position. This was accomplished by making the N tooth longer than the remaining zone teeth so that as the sector 21 moves clockwise, if no zone hole appears on the record card the pawl, even in its inoperative position, will be engaged by the extended length of the N tooth. This will immediately stop the clockwise movement of the sector.

Again referring to Fig. 6, it will be noted that upon some occasions it will not be necessary that a hole appear at any one of the numeric index points on the record card. In such a case, however, the rotation of drum 13 still must be halted to present a line of holes 14 to be engaged by the links 46. In this instance provision may be made in the sensing circuit arrangement (not shown) whereby if no hole shall have appeared after all the numeric index points on the record card have passed the sensing portion of the recording machine, the electromagnet 41 will be operated so that the pawl 38 will engage the "0" tooth on the teeth 20. The return of both the sector and the drum in either case will be exactly the same as in the cases when holes appear at both the numeric and zone index points on the record card.

The embodiment shown in Figs. 3 and 4 are substantially similar in structure and operation as that shown in Figs. 1 and 2. In fact, as noted previously, the structure shown in Fig. 5 is the same for both embodiments. The basic differences between both embodiments resides in that the drum in Fig. 1 has unidirectional rotary motion whereas the drum in Fig. 3 rotates to and fro in an oscillating fashion. The mechanism for rotating or oscillating the drums in either case can be of any well known construction. As a result, such construction is not shown in the drawings.

Because of the close similarity of structures, the detailed description above the embodiment in Figs. 1 and 2 applies in the same manner to the embodiment in Figs. 3 and 4. Accordingly, the same reference characters have been applied to Fig. 3 with the exception of the addition to each character of the suffix letter "a."

With reference to the operation of the embodiment in Fig. 3 it will be recalled that in the embodiment shown in Figs. 1 and 2 the record card was fed through the machine in reverse, i. e., with the numeric index points preceding the zone index points. In the present embodiment shown in Figs. 3 and 4 the record card is fed through the machine with the zone index points being sensed first and the numeric index points being sensed last. Because of this manner of feeding of the record cards the electromagnet 27a will be actuated upon the occurrence of a hole appearing at any one of the zone index points prior to the actuation of the electromagnet 41a. As a consequence the oscillations of the sector 21a will be halted or determined before those of the drum 13a.

At the start of the cycle, drive shaft 10a oscillates clockwise in timed relation with the feed of the record card passing through the machine, and the drum 13a is caused to rotate with the shaft by virtue of the torsion spring 15a. In the meanwhile sector 21a rotated counterclockwise by the cam 22a (see Fig. 4). During the downward movement of the cam 21a, if a hole should appear at any one of the zone index points on the record card, the electromagnet 27a will be actuated. In turn, the arm 31a will be removed from the end 33a of the pawl 28a. This will permit the spring 30a to move the pawl 28a into engagement with the corresponding sector tooth 25a. The engagement of the pawl with the sector tooth halts the clockwise movement of the sector.

As the record card continues to be fed through the machine so as to present the numeric index points for sensing, the drum 13a will be rotated to present the teeth 20a to the pawl 38a to be engaged thereby when a hole at any one of the numeric index points should be sensed (see Fig. 4). When a hole is sensed in the record card at any one of the numeric index points the electromagnet 41a is actuated to move the pawl 38a into engagement with the corresponding tooth on the drum. Thus, both the sector and the drum will be stopped in a predetermined relationship. This predetermined relationship presents a certain line of holes 14a to be engaged by the finger 50a on the crosslinks 46a. The operation of the recording elements is then exactly the same as was recited with respect to the embodiment shown in Figs. 1 and 2.

After the recording operation is completed, and the recording elements and crosslinks are reset for a new operation, the electromagnets are deenergized to permit the respective pawls to move to their inoperative positions. In the case of the sector 21a, spring 24a urges the same clockwise to follow the rotation of the cam 22a. In the case of the drum 13a the operation is a little different.

Shaft 10a, during its normal operation, rotates in a clockwise direction sufficiently to present all the stop teeth 20a to be engaged by the pawl 38a. Shaft 10a continues its clockwise rotation even though the drum is halted. However, continued rotation of the shaft during the time that the drum is stopped, tensions the spring 15a which unwinds torsionally. During the recording operation shaft 10a oscillates in a counterclockwise direction. Radially extending finger 19a meets stud 18a during its counterclockwise rotation to positively move the stud counterclockwise to starting position while tensed spring 15a retains the stud and finger in engagement.

In the operation as described above it has been assumed that a hole will appear at both the numeric and the zone index points on the same record card. As was noted before with reference to Fig. 6 many times a hole will not be sensed at a numeric index point while at other times a hole will not be sensed at the zone index point on the record card. Therefore, provision must be made to stop the oscillation of sector 21a and the clockwise oscillation of drum 13a at predetermined times to present a line of holes to be engaged by links 46a. On sector 21a the tooth N is longer than the remaining zone teeth so that if no hole appears at a zone index point the pawl 28a, remaining in its inactive position, will eventually be engaged by the N tooth.

In the case of the drum 13a the situation is substantially the same. The last or 0 tooth is longer in length than the remaining numeric tooth. As a consequence, if the pawl 38a is not actuated because of the absence of a hole at any one of the numeric index points on the record card, the length of the tooth 0 is long enough to engage the tip of the pawl 38a to stop the rotation of the drum.

The invention now enables the construction of a simplified device which utilizes a rotating drum for selecting for recording certain of a plurality of recording elements. The invention permits the use of a small amount of electrical current for its operation, but at the same time enables the device to accomplish high speed operation without affecting the degree of accuracy with which it will perform its intended functions.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

The invention is claimed as follows:

1. In a mechanical recording machine having a plurality of recording elements, the combination comprising a drive shaft rotating in timed relation with the operable parts of the machine, a drum rotatably mounted on said shaft and having rows of circumferentially spaced holes, said spaced holes when aligned axially forming lines of axially spaced holes for selecting for recording certain of said recording elements, teeth on said drum predeterminately arranged with respect to said lines, a torsion spring between said shaft and said drum to resiliently drive the drum to and from selecting position at varying speeds, a sector oscillatable about said shaft, said sector having timed electromagnetic means engageable with said teeth on said drum, teeth on said sector predeterminately arranged with respect to said teeth on said drum, a timed cam rotating in timed relation with said drive shaft for periodically oscillating said sector, a pawl engageable with said sector teeth, means to hold said pawl from engagement with said teeth, means for disengaging said pawl from said teeth, an axial line of slides linkingly connected to said recording elements and having means for positively cooperating with said lines of axially spaced holes in said drum, timed means for disengaging said slides from said drum, and means for positively moving said recording elements to and from recording position.

2. A mechanical recording machine comprising a plurality of recording elements, a drive shaft, a drum rotatable on said shaft, rows of circumferentially spaced holes forming lines of axially spaced holes in said drum, teeth on said drum predeterminately arranged with respect to said lines, a resilient drive between said shaft and said drum, a sector oscillatable about said shaft and having teeth thereon, timed means for oscillating said sector, electromagnetically operable means between said sector and said drum for engaging said drum teeth, electromagnetically operable means engageable with said sector teeth, slides connected to said recording elements and having means for positively cooperating with said lines of holes, and means for moving said recording elements to and from recording position.

3. In a recording machine including a plurality of recording elements, a device for selecting for recording certain of the recording elements, comprising a drive shaft, a drum rotatable thereon, resilient drive means between said shaft and said drum, lines of spaced holes in said drum, ratchet means on said drum predeterminately arranged with respect to said holes, a sector oscillatable with respect to said drum and having predeterminately arranged teeth, timed means for oscillating said sector, means on said sector for engaging said ratchet means at predetermined times, means for engaging said sector teeth at predetermined times, and slide means connected to said recording elements and having means positively cooperable with said lines of holes.

4. In a recording machine including a plurality of recording elements operable in selected combinations to record various characters, a device for selecting said combinations of recording elements comprising a drive shaft, means to rotate said drive shaft, a rotatable member resiliently connected to said drive shaft and rotatable thereon, said rotatable member having engageable means effective in various positions of said rotatable member to select for recording different combinations of said recording elements, stop means on said rotatable member having a series of stop elements arranged in a given position with respect to said engageable means, a second member rotatable about the axis of said drive shaft and having an engageable sector with a series of stop elements arranged in a given position thereon, arresting means on said second member for selectively engaging said stop elements on said rotatable member, means for causing said second member to rotate, second arresting means for selectively engaging said stop elements on said engageable sector thereby to position said second member, selecting members connected respectively to said recording elements and adapted for engagement with said engageable means on said rotatable member, and means for bringing said selecting members into and out of engagement with said engageable means on said rotatable member.

5. In a recording machine including a plurality of recording elements operable in selected combinations to record various characters, a device for selecting said combinations of recording elements comprising a yieldably driven rotatable member having character selecting means arranged in various patterns thereon, selective stop means on said rotatable member arranged in a given relation to said character selecting means, a second member rotatable about the axis of rotation of said rotatable member and having selective stop means thereon, arresting means on said second member for selectively engaging the selective stop means on said rotatable member, second arresting means for selectively engaging the selective stop means on said second member to determine the position of said second member, and sensing members operatively connected to said recording elements adapted to cooperate with said selecting means on said rotatable member to determine which recording elements are to be operated.

6. In a recording machine including a plurality of recording elements operable in selected combinations to record various characters, a device for selecting said combinations of recording elements comprising a rotatable member having variant character selecting portions arranged thereon in circumferentially and axially spaced relation, means cooperable with said rotatable member for selectively positioning the same according to the character which is being recorded, engaging members attached to said recording elements individually movable relative to each other and adapted to cooperate with said character selecting portions, and means for causing said engaging members to cooperate with said character selecting portions on said rotatable member when the latter is selectively positioned, said character selecting portions being adapted to change the positions of selected engaging members in relation to the other engaging members thereby to render certain of said recording elements effective for recording a selected character.

References Cited in the file of this patent

UNITED STATES PATENTS

| 988,218 | Sohm | Mar. 28, 1911 |
| 2,392,467 | Engel et al. | Jan. 8, 1946 |
| 2,612,428 | Vrom | Sept. 30, 1952 |